US 011409536B2

(12) United States Patent
He et al.

(10) Patent No.: US 11,409,536 B2
(45) Date of Patent: Aug. 9, 2022

(54) PAIRING SIMD LANES TO PERFORM DOUBLE PRECISION OPERATIONS

(71) Applicant: Advanced Micro Devices, Inc., Sunnyvale, CA (US)

(72) Inventors: Bin He, Orlando, FL (US); YunXiao Zou, Shanghai (CN); Jiasheng Chen, Orlando, FL (US); Michael Mantor, Orlando, FL (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 93 days.

(21) Appl. No.: 15/342,809

(22) Filed: Nov. 3, 2016

(65) Prior Publication Data

US 2018/0113709 A1 Apr. 26, 2018

(30) Foreign Application Priority Data

Oct. 21, 2016 (CN) .......................... 201610918142.5

(51) Int. Cl.
*G06F 9/38* (2018.01)
*G06F 9/30* (2018.01)

(52) U.S. Cl.
CPC ........ *G06F 9/3887* (2013.01); *G06F 9/30014* (2013.01); *G06F 9/30036* (2013.01); *G06F 9/3893* (2013.01)

(58) Field of Classification Search
CPC .... G06F 9/3893; G06F 9/3897; G06F 9/3887; G06F 9/3889
See application file for complete search history.

(56) References Cited

U.S. PATENT DOCUMENTS

| 8,468,191 | B2 | 6/2013 | Mantor et al. | |
|---|---|---|---|---|
| 8,521,800 | B1* | 8/2013 | Bergland | G06F 9/3001 708/523 |
| 9,613,232 | B1* | 4/2017 | Langhammer | G06G 7/16 |
| 2003/0005365 | A1* | 1/2003 | Wilson | G06F 9/30014 714/38.13 |
| 2003/0069913 | A1* | 4/2003 | Deng | G06F 7/5443 708/524 |
| 2005/0198472 | A1* | 9/2005 | Sih | G06F 9/30014 712/218 |
| 2006/0095729 | A1* | 5/2006 | Hokenek | G06F 9/3851 712/214 |
| 2007/0185953 | A1* | 8/2007 | Prokopenko | G06F 7/483 708/523 |
| 2011/0161624 | A1* | 6/2011 | Flachs | G06F 15/8061 712/4 |

(Continued)

*Primary Examiner* — Jacob Petranek
(74) *Attorney, Agent, or Firm* — Volpe Koenig

(57) ABSTRACT

A method and apparatus for performing a multi-precision computation in a plurality of arithmetic logic units (ALUs) includes pairing a first Single Instruction/Multiple Data (SIMD) block channel device with a second SIMD block channel device to create a first block pair having one-level staggering between the first and second channel devices. A third SIMD block channel device is paired with a fourth SIMD block channel device to create a second block pair having one-level staggering between the third and fourth channel devices. A plurality of source inputs are received at the first block pair and the second block pair. The first block pair computes a first result, and the second block pair computes a second result.

20 Claims, 8 Drawing Sheets

(56) References Cited

U.S. PATENT DOCUMENTS

2016/0092237 A1* 3/2016 Veith .................... G06F 9/3873
712/22
2016/0125263 A1* 5/2016 Sankaranarayanan .... G06T 7/60
382/195

* cited by examiner

PAIRING SIMD LANES TO PERFORM DOUBLE PRECISION OPERATIONS

CROSS REFERENCE TO RELATED APPLICATION

This application claims priority to Chinese Patent Application No. 201610918142.5, filed Oct. 21, 2016, the entire contents of which is hereby incorporated by reference as if fully set forth herein.

BACKGROUND

A conventional vector shader processor inside a Single Instruction/Multiple Data (SIMD) block includes four pipeline channels (e.g., X, Y, Z and W channels) with arithmetic logic units (ALUs) staggered in each cycle from one another totaling three additional levels. Considering an internal ALU latency of 5-8 cycles within and between respective pipeline stages, there can be a visible silicon footprint and power dissipation overheads due to each additional pipeline stage in the SIMD block that supports operations/calculations.

That is, each ALU includes a one cycle difference between a neighbor channel's ALU. Using a three stage channel staggered architecture, (i.e., channel time-shifted), allows for the implementation of common vector dot product operations, but introduces extra pipeline staging registers. This architecture also can be used for 64-bit float operation implementations by using 32-bit ALUs in neighboring SIMD channels. Since the use of three level channel staggered architecture introduces three additional pipeline stages, this results in register hardware and latency overhead inside one vector shader processor. Accordingly, the three pipeline stages consume useful power as most of the register flops contain data and are toggling often. An example of three level staggered channel architecture can be found in U.S. Pat. No. 8,468,191, which is incorporated herein by reference as if fully set forth.

BRIEF DESCRIPTION OF THE DRAWINGS

A more detailed understanding can be had from the following description, given by way of example in conjunction with the accompanying drawings wherein.

DETAILED DESCRIPTION OF THE EMBODIMENTS

Figure 1:
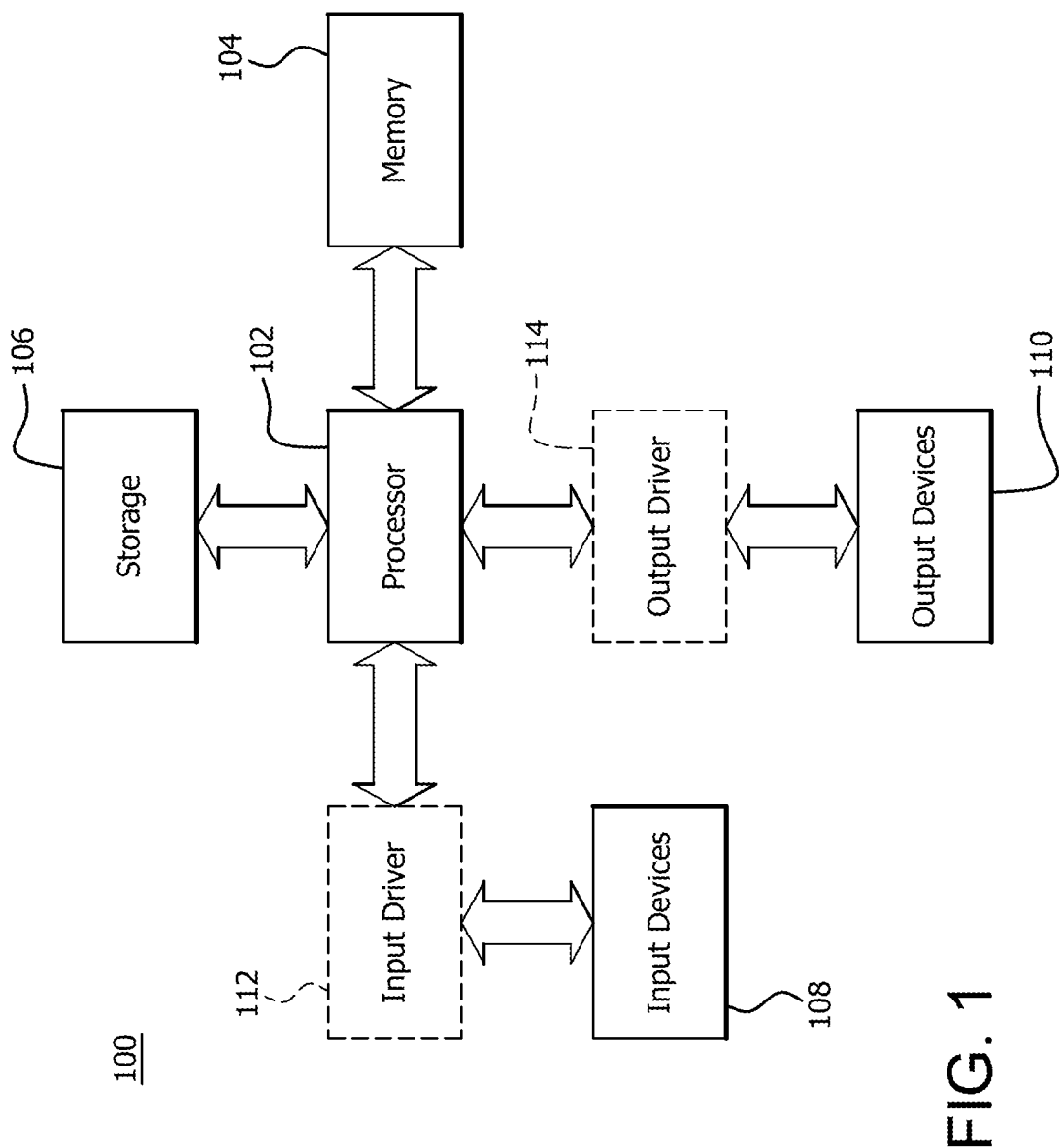
FIG. 1 is a block diagram of an example device in which one or more disclosed embodiments can be implemented.

Although a more detailed description of the embodiments is provided below, briefly a method and apparatus for performing multi-precision computation with reduced latency and low power dissipation is disclosed. For double precision and transcendental instructions, more than one single precision multiplier is utilized. Accordingly, four arithmetic logic units (ALUs) are utilized together to finish one thread's double precision or transcendental instruction computation. By utilizing dependency between two ALUs instead of four, and utilizing an additional iteration pass, one thread's transcendental instruction computation can be finished in a fewer number of cycles than conventional schemes. For a double precision multiply-add instruction computation, two extra multipliers are utilized between two ALUs. Accordingly, the same throughput can be achieved while eliminating the dependency between four ALUs, thus reducing latency by eliminating two levels of flip-flops in the pipeline and saving silicon area. Additionally, since the execution time/latency and required pipeline registers for instructions can be reduced, instructions can be executed with power savings in an entire SIMD data path.

A method for performing a multi-precision computation in a plurality of arithmetic logic units (ALUs) is disclosed. The method includes pairing a first Single Instruction/Multiple Data (SIMD) block channel device with a second SIMD block channel device to create a first block pair having one-level staggering between the first and second channel devices A third SIMD block channel device is paired with a fourth SIMD block channel device to create a second block pair having one-level staggering between the third and fourth channel devices. A plurality of source inputs are received at the first block pair and the second block pair. The first block pair computes a first result, and the second block pair computes a second result.

An apparatus for performing a multi-precision computation is disclosed. The apparatus includes a first arithmetic logic unit (ALU), a second ALU, a third ALU, and a fourth ALU. The second ALU is operatively connected with the first ALU, wherein the first ALU is paired with a second ALU having one-level staggering as a first compute unit configured to receive a plurality of inputs and compute a first result. The fourth ALU is operatively connected with the third ALU, wherein the third ALU is paired with the fourth ALU having one-level staggering as a second compute unit configured to receive the plurality of inputs and compute a second result.

A non-transitory computer-readable medium having instructions recorded thereon, that when executed by a computing device, causes the computing device to perform operations as disclosed. The operations include pairing a first Single Instruction/Multiple Data (SIMD) block channel device with a second SIMD block channel device to create a first block pair having one-level staggering between the first and second channel devices A third SIMD block channel device is paired with a fourth SIMD block channel device to create a second block pair having one-level staggering between the third and fourth channel devices. A plurality of source inputs are received at the first block pair and the second block pair. The first block pair computes a first result, and the second block pair computes a second result.

FIG. 1 is a block diagram of an example device 100 in which one or more disclosed embodiments can be implemented. The device 100 can include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, a main display is not needed. Accordingly, a source device of video can be included only. In this way, the control territory can be an office environment with a plurality of portable devices and no main display.

Figure 2A:
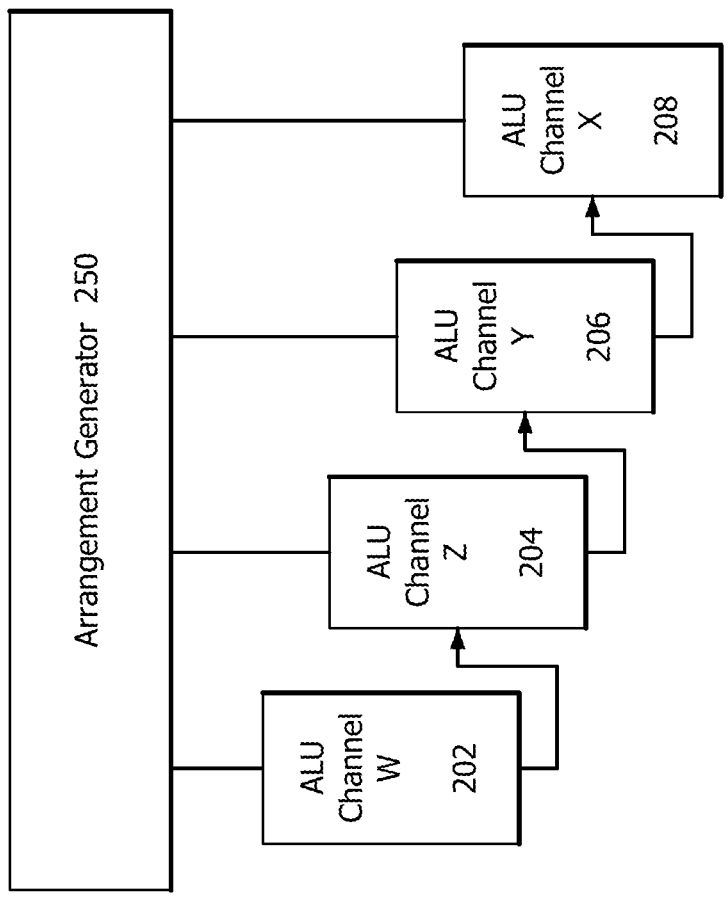
FIG. 2A is an example diagram of a conventional SIMD apparatus with three-level channel staggering for performing multi-precision computations.

FIG. 2A is an example diagram of a conventional SIMD apparatus 200A with three-level channel staggering for performing multi-precision computations. The apparatus 200A includes a plurality of ALU channels W, Z, Y, and X, (designated 202, 204, 206 and 208). The channel ALUs 202, 204, 206, and 208 are, for example, multiply-add units (MADDs). An arrangement generator 250 is in communication with the ALUs 202, 204, 206 and 208 to provide inputs for ALUs 202, 204, 206 and 208. As shown in FIG. 2A, ALU 202 can provide a result to ALU 204, ALU 204 can provide a result to ALU 206, and ALU 206 can provide a result to ALU 208.

Figure 2B:
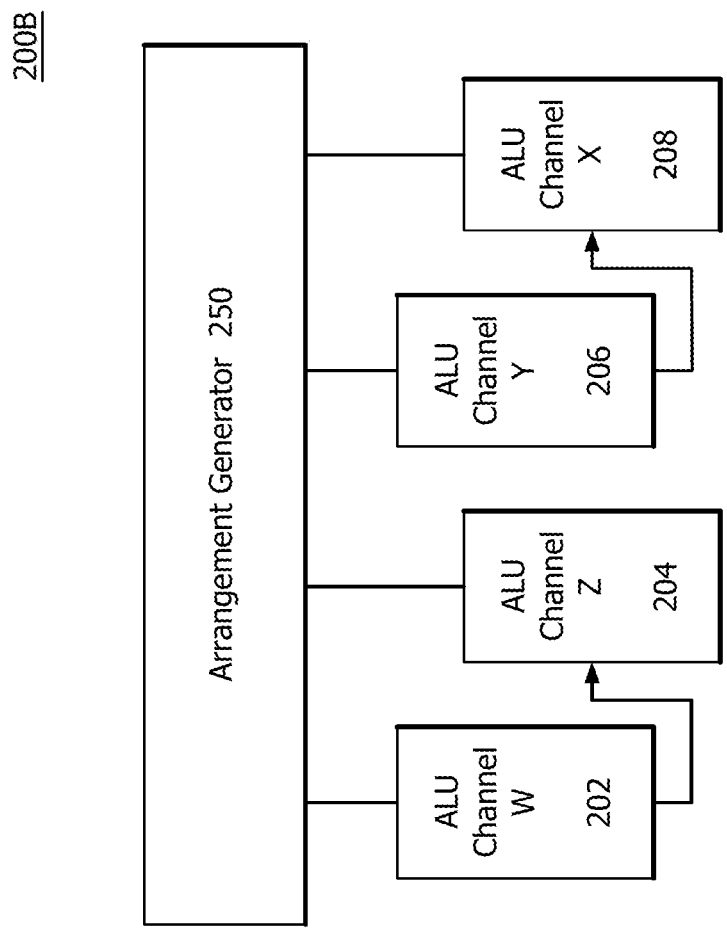
FIG. 2B is a diagram of an example SIMD apparatus with paired channels and one-level staggering for performing multi-precision computations.

FIG. 2B is a diagram of an example SIMD apparatus 200B with paired channels and one-level staggering for performing multi-precision computations. Similar to apparatus 200A, the apparatus 200B includes a plurality of ALU channels W, Z, Y, and X (designated 202, 204, 206 and 208). The channel ALUs 202, 204, 206 and 208 are, for example, multiply-add units (MADDs). An arrangement generator 250 is in communication with the ALUs 202, 204, 206 and 208 to provide inputs for ALUs 202, 204, 206 and 208. As shown in FIG. 2, ALU 202 provides a result to ALU 204, while ALU 206 provides a result to ALU 208 due to the one cycle time-shifted operation mode.

The mapping table, (i.e., Table 1), below represents an example mapping of values for each channel. That is, the sources, (e.g., src_a, src_b, and src_c), map to the values or functions in Table 1, where Mad_f_32 is 32-bit chained multiply-add operation equal to A*B+C. Variables V0, V1, and V2 are selected vector register contents used as source operands in the calculations.

TABLE 1

|  | W or Y slot | | | Z or X slot | | |
| --- | --- | --- | --- | --- | --- | --- |
|  | src_a | src_b | src_c | src_a | src_b | src_c |
| Mad_f32 | V0 | V1 | V2 | V0 | V1 | V2 |

Figure 3A:
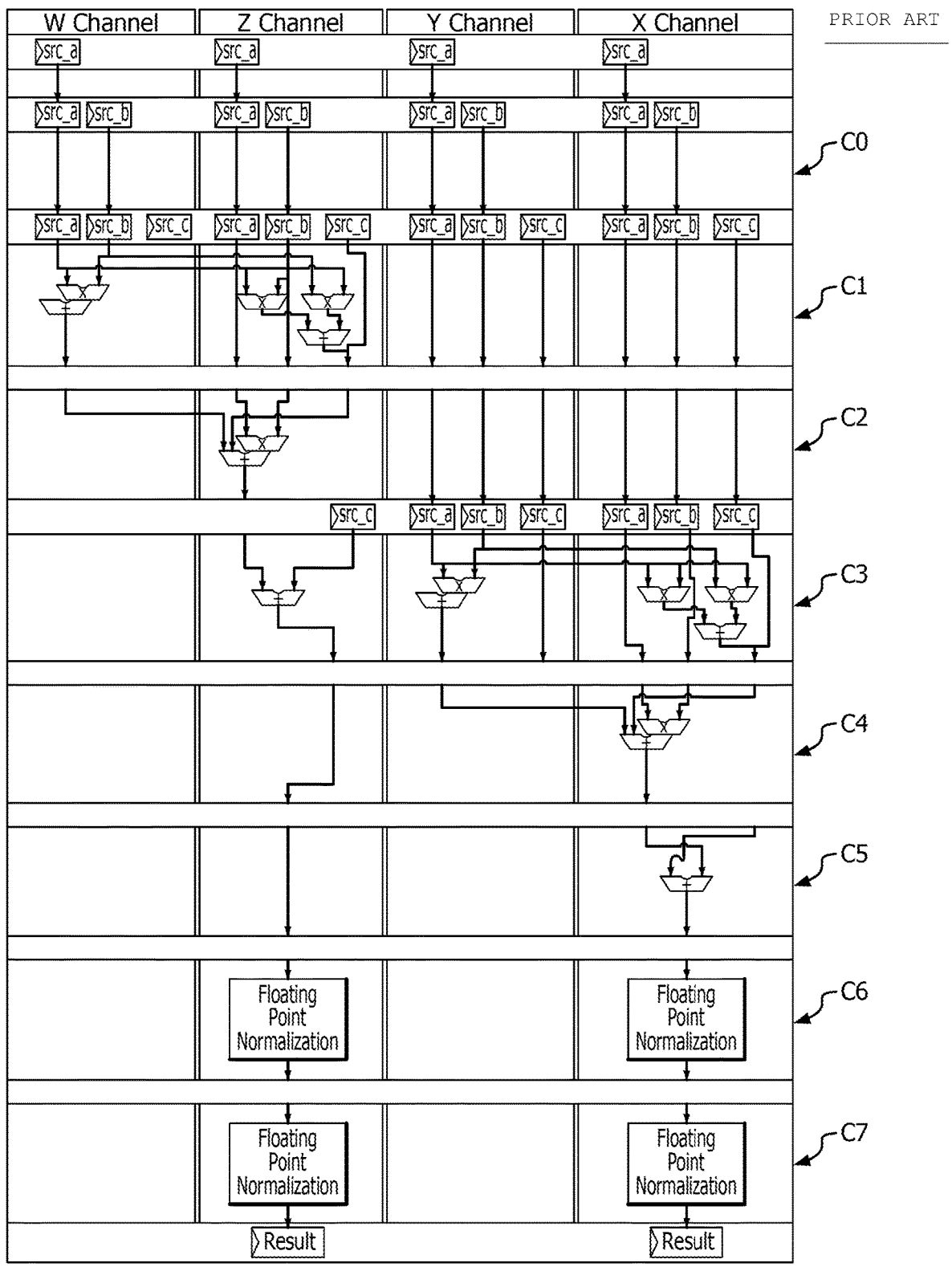
FIG. 3A is an example of a conventional 64-bit float operation implementation using four 32-bit ALUs staggered in three levels having half-rate performance.

FIG. 3A is an example of a conventional 64-bit float operation implementation 300A using four 32-bit ALUs staggered in three levels having half-rate performance versus 32-bit float operations. FIG. 3A depicts the detailed diagram of the apparatus 200A of FIG. 2A utilizing the conventional three-level staggered pipeline with eight (i.e., C0-C7) main cycles/stages for performing 64-bit precision computation in half-rate versus 32-bit precision computation. Two channels (Z and X) provide 64-bit results while channels W and Y perform operations in support of the Z and X channels in two earlier cycles, (i.e., C1-C2 and C3-C4), respectively. During the rest of the time during an operation, the W and Y channels toggle idle and consume power without producing relevant results. Due to the three-level staggering, the Y and X channels operate two cycles later than the W channel which introduces additional latency and pipeline registers. Floating point normalizations are performed on the results in clock cycles C6 and C7 prior to outputting the result to the output registers of channels Z and X.

Figure 3B:
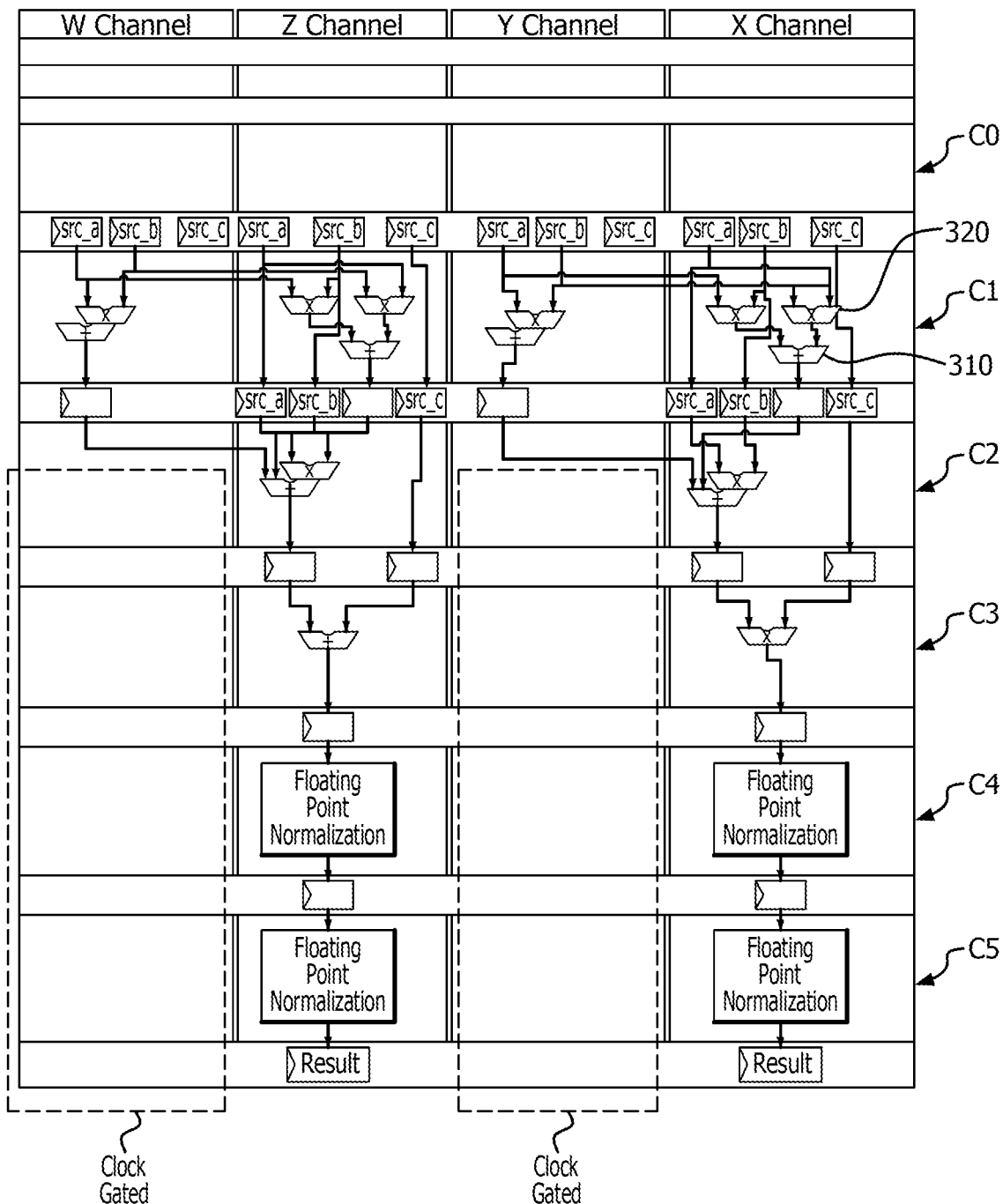
FIG. 3B is an example pipeline diagram for performing 64-bit precision computations having half-rate performance versus 32-bit precision computation in an SIMD block with paired channels and one-level staggering in the paired channels.

FIG. 3B is an example pipeline diagram 305 for performing 64-bit precision computations having half-rate performance versus 32-bit precision computation in an SIMD block with paired channels and one-level staggering in the paired channels. The diagram 305 describes the operation of apparatus 200B of FIG. 2B, having a reduced number of required cycles and 32-bit channels which are partially clock-gated during the operation. Accordingly, this structure introduces SIMD channel pairing and only single-level (i.e., 1-level) staggering. Also, by clock-gating idle pipeline cycles and idle channels, power dissipation can be reduced. FIG. 3B includes channels W, Z, Y and X, which can be associated with ALUs 202, 204, 206 and 208, respectively. As opposed to the conventional apparatus 200A depicted in FIG. 2A, these channels are staggered with one clock shift in each pair, (i.e., 1 extra stage instead of 3). A plurality of source inputs, (e.g., src_a, src_b, and src_c), are combined together in data arrangement cycles C0 to prepare the operand for the following computation cycles. Operations on the inputs can be performed during clock cycles, (e.g., C1, C2, C3, C4 and C5), to arrive at the eventual result using adders 310, multipliers 320, or multiplexers (MUX) 330.

As shown in FIG. 3B, the W channel result and Y channel result is computed in clock cycle C1. The W channel result is provided to ALU 204 in the Z channel at clock cycle C2. The Y channel result is provided to ALU 208 in the X channel also at clock cycle C2. After that, on the following C2, C3, C4 and C5 cycles, both W and Y channels are dynamically clock-gated to block any data change and transfer to provide power savings. Channels Z and X continue to operate in normal mode on cycles C2-C5 providing calculations for their respective output registers. Similar to FIG. 3A, floating point normalizations are performed on the results in the final two clock cycles (in this case C4 and C5) prior to outputting the results to the output registers of channels Z and X. Although a dynamic clock gating circuit is not shown, an instruction opcode decoder and an appropriate state machine can generate any clock gating control sequences on a per-channel and per-stage basis.

Figure 4:
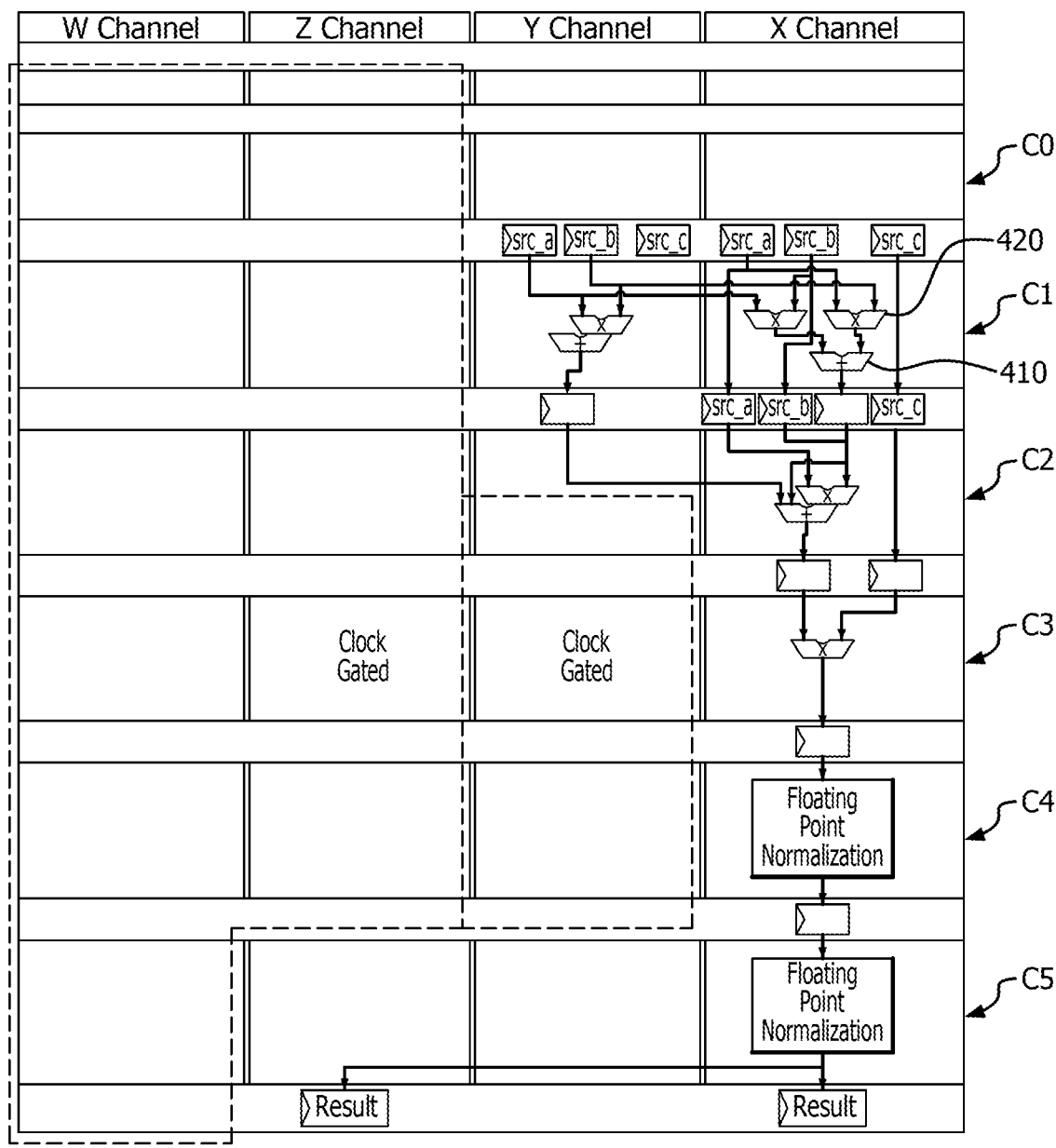
FIG. 4 is an example pipeline diagram for performing 64-bit precision computation having quarter-rate performance versus 32-bit precision including clock-gated paired SIMD channels with one level staggering in the paired channels.

FIG. 4 is an example pipeline diagram 400 for performing 64-bit precision computation having quarter-rate performance versus 32-bit precision including clock-gated paired SIMD channels with one level staggering in the paired channels. FIG. 4 includes channels W, Z, Y and X, which are, for example, associated with ALUs 202, 204, 206 and 208, respectively. As opposed to the conventional apparatus depicted in FIG. 2A, the channels depicted in FIG. 4 are staggered with one clock shift in each pair, (i.e., 1 extra stage instead of 3), similar to apparatus 200B of FIG. 2B. A plurality of source inputs, (e.g., src_a, src_b, and src_c), are combined together in data arrangement cycle C0 to compute a result. Operations on the inputs can be performed during clock cycles, (e.g., C1, C2, C3, C4 and C5), to arrive at the eventual result using adders 410 or multipliers 420.

As shown in FIG. 4, the Y channel result is computed during clock cycles C1 and C2. The Y channel result is provided to ALU 208 in the X channel at clock cycle C2. The result from clock cycle C1 in the X channel is summed with the src_c input in clock cycle C2. Channels W and Z are not used and dynamically clock-gated, (i.e., idled and turned on as needed), except for clock cycle C5 in channel Z, where the result is copied from Channel X to the output register for channel Z. Accordingly, a result is output at the output registers of Channels X and Z.

Figure 5A:
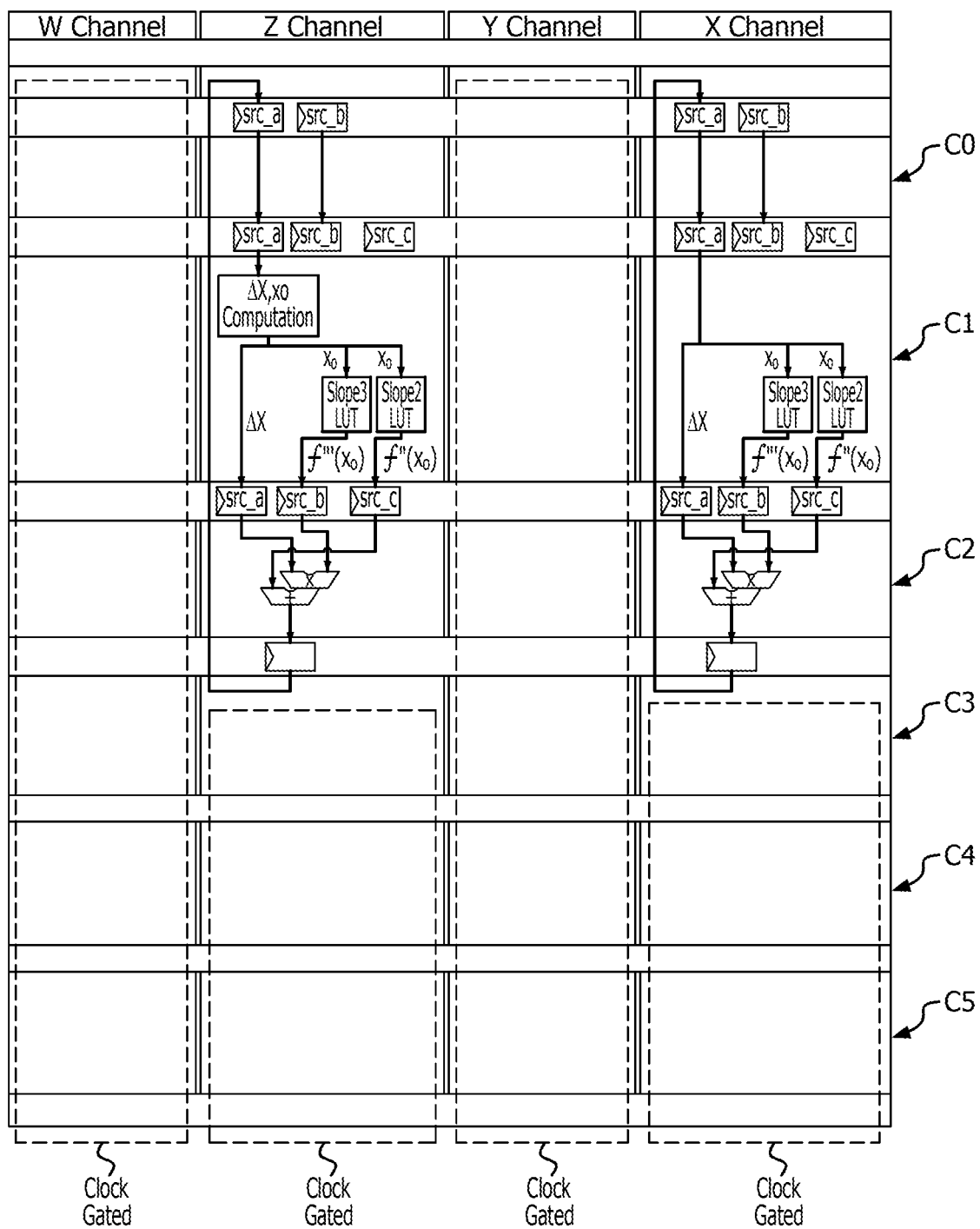
FIG. 5A is an example pipeline diagram for performing a first pass of a transcendental two-pass single and double precision computation in SIMD channels with one level staggering in the paired channels.
Figure 5B:
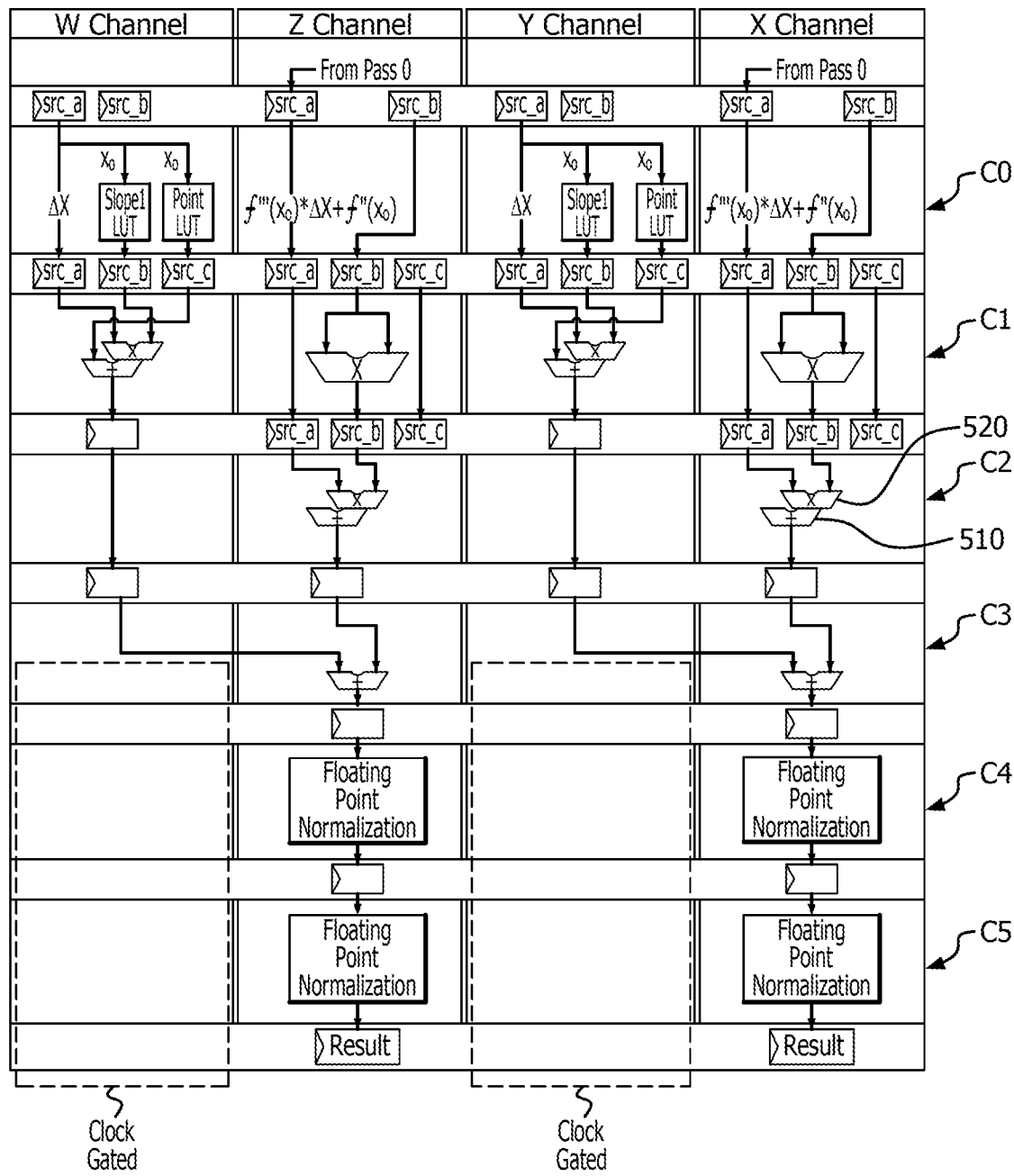
FIG. 5B is an example pipeline diagram for performing a second pass of a transcendental two-pass single and double precision computation in SIMD channels with one level staggering in the paired channels.

FIGS. 5A-5B are an example pipeline diagram 500 for performing a transcendental two-pass single precision computation on an SIMD block with paired channels using one level staggering in the paired channels. FIG. 5A is an example pipeline diagram for performing a first pass of a transcendental two-pass single and double precision computation in SIMD channels with one level staggering in the paired channels, while FIG. 5B is an example pipeline diagram for performing a second pass of a transcendental two-pass single and double precision computation in SIMD channels with one level staggering in the paired channels The mapping table, (i.e., Table 2), below indicates a mapping for each channel for two-pass implementation of the transcendental function. That is, the sources, (e.g., src_a, src_b, and src_c), map to the values or functions in Table 2.

FIG. 5A includes channels W, Z, Y and X, which are associated, for example, with ALUs 202, 204, 206 and 208, respectively. A plurality of source inputs, (e.g., src_a, src_b, and src_c), are combined together in data arrangement cycle C0 to prepare the data for following computation of a result. Operations on the inputs can be performed during clock cycles, (e.g., C1, C2, C3, C4 and C5), to arrive at the eventual result using adders 510, multipliers 520, and lookup tables, (designated $\Delta x$, Slope1, Slope2, Slope 3, and Point lookup tables (LUT)).

Referring to FIG. 5A, operations are performed during the first pass, (e.g., pass 0, or transpass 0 in Table 2), in clock cycles C1 and C2 on channels Z and X. For example, lookup tables $\Delta x$, Slope2 and Slope3 are utilized during C1. During clock cycle C2, the results of $\Delta x$ and Slope 3 are multiplied and then added to the result from Slope2. The resultants for channels Z and X for Pass 0 are returned to src_a in C3, for use during the second pass, (i.e., Pass 1). Unused channels W and Y are clock-gated to not consume dynamic power. Cycles C3-C5 in active channels Z and X can be also clock-gated or skipped along with idle channels W and Y.

Referring now to FIG. 5B, operations are performed during the second pass, (e.g., pass 1, or transpass 1 in Table 2), in clock cycles C1, C2 and C3. For example, during clock cycle C1, lookup tables $\Delta x$, Slope1 and Point are utilized. The results of the $\Delta x$ lookup table and Slope1 are multiplied and the resultant added to the result of the Point lookup table in the W and Y channels. During C2, the Z channel result from Pass 0 is multiplied with src_b and the resultant added to src_c. Also, during C2, the X channel result from Pass 0 is multiplied with src_b and the resultant added to src_c.

During clock cycle C3, the resultants from clock cycles C1 and C2 are added together in the Z and X channels to provide results in the Z and X channels. For example, in the Z channel, the result from C2 is multiplied by $\Delta x^2$, the result of which is added to the result from the W channel in clock cycle C1. Also during clock cycle C3, in the X channel, the result from C2 is multiplied by $\Delta x^2$, the result of which is added to the result from the Y channel in clock cycle C1. As shown in FIG. 5B, in cycles C4-C5, the W and Y channels are inactive and a clock-gating technique can be applied to reduce the dynamic power. In addition, the results in the Z and X channels undergo floating point normalization in cycles C4 and C5 prior to being output as results to the output registers of the Z and X channels.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor

TABLE 2

| | W or Y slot | | | Z or X slot | | |
|---|---|---|---|---|---|---|
| | src_a | src_b | src_c | src_a | src_b | src_c |
| Mad_f32 | v0 | v1 | v2 | v0 | v1 | v2 |
| trans pass0 | | | | $\Delta x$ | $f'''(x_o)$ | $f''(x_o)$ |
| trans pass1 | $\Delta x$ | $f'(x_o)$ | point | $f'''(x_o)*\Delta x + f''(x_o)$ | $\Delta x*\Delta x$ | | manufacturing process to manufacture a processor which implements aspects of the present invention.

The methods or flow charts provided herein can be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing a multi-precision computation in a plurality of arithmetic logic units (ALUs), comprising:
   pairing a first Single Instruction/Multiple Data (SIMD) block channel device with a second SIMD block channel device to create a first block pair having one-level staggering between the first and second channel devices;
   pairing a third SIMD block channel device with a fourth SIMD block channel device to create a second block pair having one-level staggering between the third and fourth channel devices;
   receiving a plurality of source inputs at the first block pair and the second block pair;
   computing a first result by the first block pair; and
   computing a second result by the second block pair, wherein the computation of the second result is performed concurrently in a same number of clock time cycles as the computing by the first block pair, and wherein the computations being performed in the first block pair to compute the first result are performed in a same clock time cycle as a corresponding computation being performed in the second block pair.

2. The method of claim 1, further comprising clock gating one or more of the SIMD block channel devices during a period that SIMD block channel device is not used for calculations.

3. The method of claim 1, further comprising outputting the first result at an output register of the first SIMD block channel device.

4. The method of claim 1, further comprising outputting the first result at an output register of the second SIMD block channel device.

5. The method of claim 1, further comprising outputting the second result at an output register of the third SIMD block channel device.

6. The method of claim 1, further comprising outputting the second result at an output register of the fourth SIMD block channel device.

7. The method of claim 1 wherein the first result and the second result are the same result.

8. The method of claim 1, further comprising performing normalization on the result.

9. The method of claim 1 wherein the first result is generated in a first pass of a transcendental operation and utilized by the first block pair to compute a third result for output.

10. The method of claim 9 wherein the second result is generated in the first pass of a transcendental operation and utilized by the second block pair to compute a fourth result for output.

11. An apparatus for performing a multi-precision computation, comprising:
    a first arithmetic logic unit (ALU);
    a second ALU operatively connected with the first ALU, wherein the first ALU is paired with a second ALU having one-level staggering as a first compute unit configured to receive a plurality of inputs and compute a first result;
    a third ALU; and
    a fourth ALU operatively connected with the third ALU, wherein the third ALU is paired with the fourth ALU having one-level staggering as a second compute unit configured to receive the plurality of inputs and compute a second result, and
    wherein the second compute unit computes the second result concurrently in a same number of clock time cycles with the first compute unit, and wherein the computations being performed in the first compute unit to compute the first result are performed in a same clock time cycle as a corresponding computation being performed in the second compute unit.

12. The apparatus of claim 11, further comprising an arrangement generator operatively connected to the first, second, third and fourth ALUs to provide the plurality of inputs to the respective ALUs.

13. The apparatus of claim 11, further comprising a clock gating device operatively coupled with the first, second, third, and fourth ALUs, for clock gating one or more of the ALUs during a period that ALU is not in use for calculations.

14. The apparatus of claim 11 wherein the first, second, third and fourth ALUs include a respective output register.

15. The apparatus of claim 14 wherein the first result is output at the output register of the first ALU.

16. The apparatus of claim 14 wherein the first result is output at the output register of the second ALU.

17. The apparatus of claim 14 wherein the second result is output at the output register of the third ALU.

18. The apparatus of claim 14 wherein the second result is output at the output register of the fourth ALU.

19. The apparatus of claim 11 wherein the first result is generated in a first pass of a transcendental operation and utilized by the first compute unit to compute a third result for output and the second result is generated in the first pass of a transcendental operation and utilized by the second compute unit to compute a fourth result for output.

20. A non-transitory computer-readable medium having instructions recorded thereon, that when executed by a computing device, cause the computing device to perform operations including:
    pairing a first Single Instruction/Multiple Data (SIMD) block channel device with a second SIMD block channel device to create a first block pair having one-level staggering between the first and second channel devices;
    pairing a third SIMD block channel device with a fourth SIMD block channel device to create a second block pair having one-level staggering between the third and fourth channel devices;
    receiving a plurality of source inputs at the first block pair and the second block pair;
    computing a first result by the first block pair; and
    computing a second result by the second block pair, wherein the computation of the second result is performed concurrently in a same number of clock time cycles as the computing by the first block pair, and wherein the computations being performed in the first block pair to compute the first result are performed in a same clock time cycle as a corresponding computation being performed in the second block pair.

* * * * *